US009937885B2

(12) United States Patent
Allen et al.

(10) Patent No.: US 9,937,885 B2
(45) Date of Patent: Apr. 10, 2018

(54) FRONT UNDER-RUN PROTECTION DEVICE FOR MEDIUM DUTY TRUCK

(71) Applicant: SportChassis, LLC, Clinton, OK (US)

(72) Inventors: Malcolm Allen, Cordell, OK (US); James Burnam, Clinton, OK (US); Nicholas Walenciak, Weatherford, OK (US); Kenneth Wagnon, Clinton, OK (US)

(73) Assignee: SportChassis, LLC, Clinton, OK (US)

( * ) Notice: Subject to any disclaimer, the term of this patent is extended or adjusted under 35 U.S.C. 154(b) by 0 days.

(21) Appl. No.: 15/402,164

(22) Filed: Jan. 9, 2017

(65) Prior Publication Data

US 2017/0247003 A1   Aug. 31, 2017

Related U.S. Application Data

(60) Provisional application No. 62/276,443, filed on Jan. 8, 2016.

(51) Int. Cl.
| B60R 19/36 | (2006.01) |
| B60R 19/56 | (2006.01) |
| B60R 19/12 | (2006.01) |
| B60R 19/24 | (2006.01) |

(52) U.S. Cl.
CPC .............. *B60R 19/56* (2013.01); *B60R 19/12* (2013.01); *B60R 19/24* (2013.01)

(58) Field of Classification Search
CPC .......... B60R 19/56; B60R 19/12; B60R 19/24
See application file for complete search history.

(56) References Cited

U.S. PATENT DOCUMENTS

| 7,900,983 | B2 * | 3/2011 | Saitou | B60R 19/56 |
| | | | | 293/102 |
| 8,287,012 | B2 * | 10/2012 | Kokubo | B21D 53/88 |
| | | | | 293/102 |
| 2015/0076846 | A1 * | 3/2015 | Musale | B60R 19/56 |
| | | | | 293/133 |

* cited by examiner

*Primary Examiner* — Lori L Lyjak
(74) *Attorney, Agent, or Firm* — Sean O'Connell, PLLC

(57) ABSTRACT

A front under-run protection assembly for a medium duty truck. The front under-run protection assembly includes a front bar assembly and a support assembly. The support assembly includes a beam and attachment plates. The front bar assembly has a bar positioned under the bumper of the truck and shaped to match the bumper shape. The front bar assembly includes a plurality of strengthening gussets attached to a back side of the bar. The bar assembly is attached to the support assembly which is in turn attached to the frame of the truck.

5 Claims, 2 Drawing Sheets

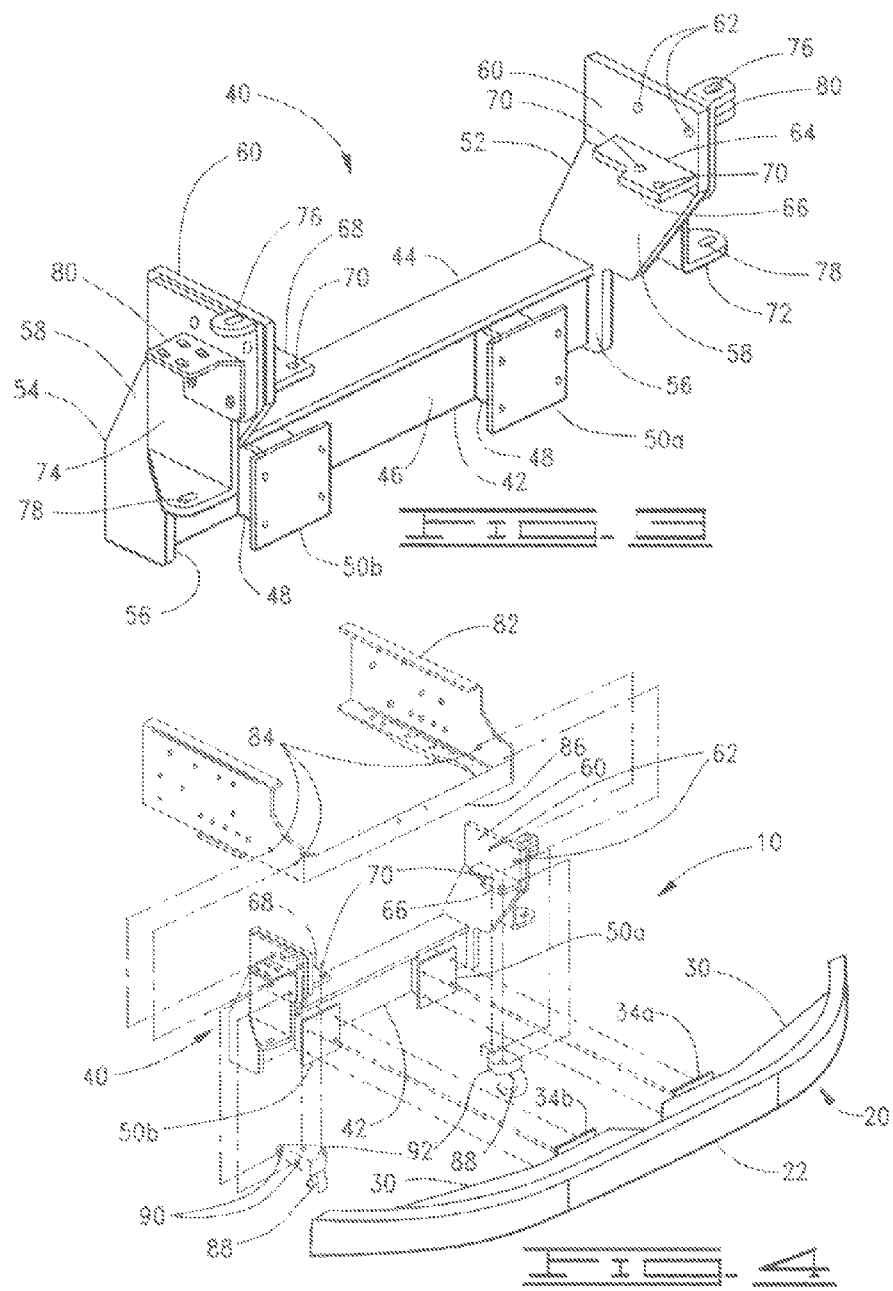

FRONT UNDER-RUN PROTECTION DEVICE FOR MEDIUM DUTY TRUCK

FIELD OF THE INVENTION

The present invention relates to commercial vehicles or trucks and more particularly to the front under-run protection device for medium duty trucks.

BACKGROUND OF THE INVENTION

Many truck accidents take place every year all over the world, resulting in injury to thousands of people, in addition to causing many deaths. Cars remain at a decided disadvantage in accidents with medium and heavy duty trucks. The injury risk in accidents involving medium and heavy duty trucks appears to be far greater for occupants of opponent vehicles, especially for cars. This risk increases in the case of car to truck frontal collisions, particularly where the lighter car is likely to travel under the front of the much heavier truck. As a preventative measure, front under-run protection devices (FUPD) are required in many jurisdictions. A FUPD serves to prevent a car involved in a frontal collision with a truck from running under the front of the truck.

SUMMARY OF THE INVENTION

The present invention is directed to a front under-run protection device for use with a medium duty truck. The device comprises a front bar assembly and a support assembly. The front bar assembly comprises a longitudinal tube having a front side and a back side, a plurality of bar gussets secured to the back side of the tube, and a plurality of mounting plates secured to the back side of the tube. The support assembly comprises a longitudinal beam, a plurality of mount plates secured to a front side of the beam, a left attachment plate and a right attachment plate, a left frame bracket, and a right frame bracket. Each attachment plate comprises a beam contact surface secured to an end of the beam and a frame attachment surface, the frame attachment surface defining a slot. Each attachment plate is configured such that the frame attachment surface is positioned forward of a vertical plane containing the beam. The left frame bracket is secured to the slot of the left attachment plate and the right frame bracket secured to the slot of the right attachment plate. Each one of the mount plates of the support assembly are secured to one of the mounting plates of the front bar assembly.

In an alternative embodiment the invention is directed to a vehicle having a front under-run protection device. The vehicle comprises a vehicle frame, a vehicle bumper disposed forward of a front end of the vehicle frame, and a front under-run protection assembly. The front under-run assembly comprises a support assembly and a front bar assembly. The support assembly comprises a longitudinal beam, a strengthening plate secured to the beam, a plurality of mount plates secured to a front side of the beam, a left attachment plate, a right attachment plate, a left frame bracket, and a right frame bracket. The left attachment plate comprises a beam contact surface secured to a first end of the beam and a frame attachment surface defining a slot. The left attachment plate is configured such that the frame attachment surface is positioned forward of a vertical plane containing the beam. The right attachment plate comprises a beam contact surface secured to a second end of the beam and a frame attachment surface defining a slot. The right attachment plate is configured such that the frame attachment surface is positioned forward of a vertical plane containing the beam. The left frame bracket is secured to the slot of the left attachment plate and the right frame bracket is secured to the slot of the right attachment plate. The frame attachment surface of the left attachment plate is connected to a left side of the front end of the vehicle frame and the frame attachment surface of the right attachment plate is connected to a right side of the front end of the vehicle frame. The left frame bracket is connected to the left side of the front end of the vehicle frame and the right frame bracket is connected to the right side of the front end of the vehicle frame. The front bar assembly comprises a longitudinal tube having a front side and a back side, a plurality of bar gussets secured to the back side of the tube, and a plurality of mounting plates secured to the plurality of bar gussets. The tube has a curved shape such that the back side is convex and the gussets are disposed to span a curved portion of the tube. The mounting plates are connected to the mount plates of the support assembly. The front bar assembly is mounted directly below the vehicle bumper.

BRIEF DESCRIPTION OF THE DRAWINGS

FIG. 3 is an isometric view of a support assembly for use with the front under-run protection assembly shown in FIG. 1.

FIG. 4 is an exploded view of the components of the front under-run protection assembly shown in FIG. 1.

DETAILED DESCRIPTION OF THE INVENTION

The preferred embodiment of the present invention is directed to a front under-run protection device (FUPD) for a medium or heavy duty truck. More preferably, the present invention is directed to a FUPD for a Freightliner M2 model truck, though the principles and parts used herein may be adapted to other vehicles. Significant design and testing efforts of the present invention have provided a FUPD that is structurally sound, meeting various regulatory requirements such as the Economic Commission for Europe and Australian Design Rules. Additionally, the present invention is intended to provide a FUPD that aesthetically conforms to the design of the subject truck.

Figure 1:
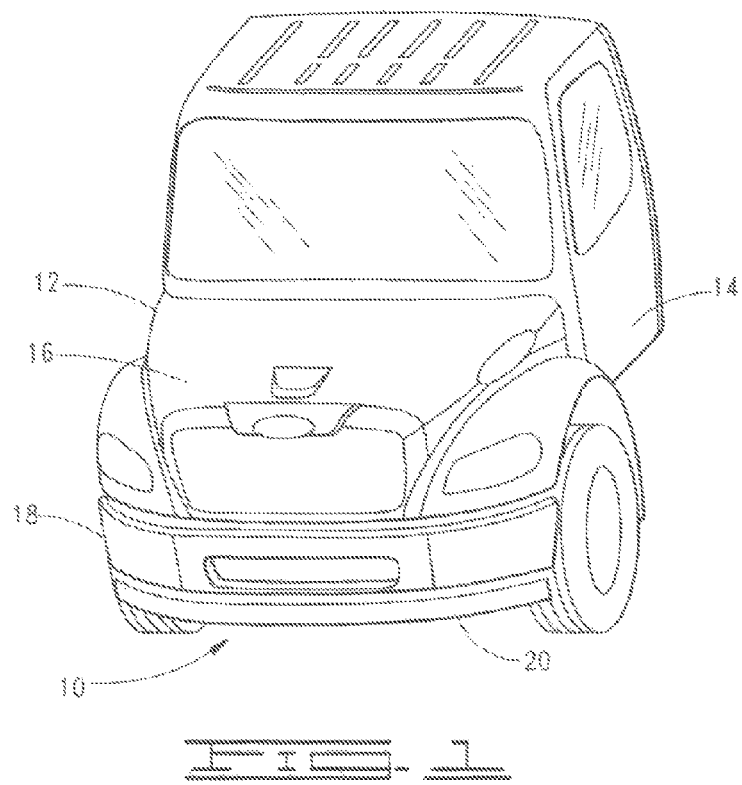
FIG. 1 is a view of a truck having a front under-run protection assembly built in accordance with the present invention.

With reference now to the drawings in general and to FIG. 1 in particular, there is shown therein a preferred embodiment for a front under-run protection device (FUPD) 10 constructed in accordance with the present invention as installed on a vehicle 12. The vehicle 12 shown comprises a truck having a cab 14, hood 16, bumper 18, and the FUPD 10. One skilled in the art will appreciate the vehicle 12 will also comprise a truck frame not visible (partially represented in FIG. 4 discussed below), as well as other components not pertinent to the present invention. The FUPD 10, preferably installed below the bumper 18, comprises a front bar 20 and a support assembly (to be further described below). The front bar 20 is the only visible portion of the FUPD assembly 10. More preferably, the front bar 20 of the FUPD 10 is shaped and positioned to match or mimic the look of the bumper 18. As one skilled in the art will appreciate, the structure, mounting, and positioning of the FUPD 10 is done to comply with applicable regulatory standards, for example to reflect the appropriate height and width of the front bar 20.

Figure 2:
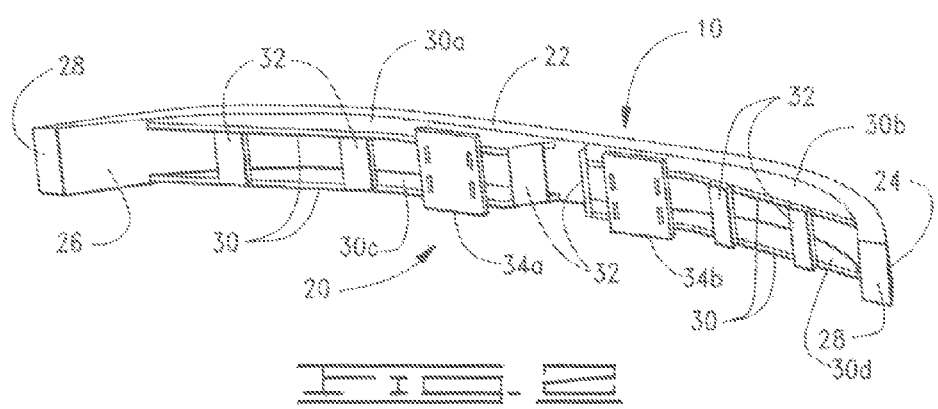
FIG. 2 shows a rear isometric view of a front bar assembly for use with the front under-run protection assembly shown in FIG. 1.

Turning now to FIG. 2, the front bar 20 of the FUPD assembly 10 is shown greater detail. The front bar 20 is preferably an assembly comprising a longitudinal tube 22 having a front side 24 and a back side 26. Preferably, the tube 22 is of sufficient length to span the width of the truck 12 axle and tires. More preferably, the tube 22 will be curved in shape, and most preferably the tube will be bent proximate each end. The shape of the tube 22 is such that the back side 26 is convex, and such that the front side 24 of the bar 20 will mimic a curve and look of the truck 12 bumper 18. In the preferred embodiment, the tube 22 is comprised of a 3/16"×2"×5" steel tube. Caps 28 are used at each end of the tube 22 to keep foreign objects or debris out of the tube. The caps 28 are preferably fabricated of 3/16" steel and secured to the tube 22 by welding.

With continued reference to FIG. 2, the front bar 20 further comprises a plurality of gussets 30 secured to the back side 26 of the bar. Preferably, four gussets 30a, 30b, 30c, and 30d are used, and are shaped to match the curved profile of the front bar 20. More preferably, the gussets 30 are fabricated of 3/8" steel. Gussets 30a and 30b are secured by welding proximate a top edge of the tube 22, with one gusset along each of the curved portions or ends of the tube 22. Gussets 30c and 30d are secured by welding proximate a bottom edge of the tube 22, and below the gussets 30a and 30b. A plurality of gussets supports 32 are secured by welding between the gussets 30 for added stability and strength. Preferably, three supports 32 are used for each pair of gussets 30a-30c and 30b-30d. More preferably, the gusset supports 32 are fabricated of 3/8" steel. The bar assembly 20 further comprises a plurality of mounting plates 34. The plates 34 are preferably fabricated of 3/8" steel and define a plurality of bolt securing holes for use in a manner yet to be described. The plates 34 are secured by welding to the gussets 30. Preferably two plates 34a and 34b are used, with one plate secured between each pair of gussets 30a-30c and 30b-30d.

Referring now to FIG. 3, there is shown therein the support assembly 40 of the FUPD 10. The support assembly 40 comprises a longitudinal beam 42 and a strengthening plate 44 secured to the beam. Preferably, the plate 44 is secured by welding to a top side 46 of the beam 42. More preferably, the beam 42 is comprised of a 3/16"×3"×5" steel tube and the plate 44 is comprised of a 1/2" steel plate. Additionally, the support assembly 40 comprises a plurality of mount spacers 48 secured by welding to a front side 50 of the beam 42. The spacers 48, comprised of 3/16"×3"×5" steel tube, are disposed for mounting a plurality of mount plates 50. The plates 50 are preferably fabricated of 3/8" steel and define a plurality of bolt securing holes. Preferably two mount plates 50a and 50b are used, and are preferably disposed for mating with the mounting plates 34a and 34b of the front bar assembly 20.

Continuing with FIG. 3, the support assembly 40 further comprises a left attachment plate 52 and a right attachment plate 54. The attachment plates 52 and 54 are preferably fabricated of 3/4" steel and are vertically disposed at opposite ends of the beam 42. Each attachment plate 52 and 54 comprises a lower beam contact surface 56, an intermediate section 58, and an upper frame attachment surface 60. The beam contact surface 56 of each plate 52 and 54 is secured by welding to the opposing ends of the beam 42. The intermediate section 58 of each plate 52 and 54 is configured such that the frame attachment surface 60 is positioned forward of a vertical plane containing the beam 42. The frame attachment surface 60 preferably defines a plurality of bolt holes 62 and a slot 64 for use in manner yet to be discussed.

The support assembly 40 further comprises a left frame bracket 66 and a right frame bracket 68. The brackets 66 and 68 are preferably fabricated of 1/2" steel and each define a plurality of bolt holes 70. The left bracket 66 is secured to the slot 64 on an inside of the left attachment plate 52 by plug welding, while the right bracket 68 is secured to the slot 64 on an inside of the right attachment plate 54 by plug welding.

With continued reference to FIG. 3, the support assembly 40 also comprises a left bumper connection plate 72 and a right bumper connection plate 74. The bumper connection plates 72 and 74 are preferably fabricated from 1/2" steel and are secured by welding to an outside of the frame attachment surface 60 of the left attachment plate 52 and right attachment plate 54 respectively. The bumper plates 72 and 74 of the present invention comprise first 76 and second 78 bolt slots for securing the bumper 18 to the support assembly 40. The support assembly 40 further comprises a pair of hood attachment plates 80. The hood attachment plates 80 are preferably 1/4" steel L-brackets defining bolt secured by welding to the outside of the bumper connection plates 72 and 74. One skilled in the art will appreciate the bumper connection plates 72 and 74 and the hood attachment plates 80 may be configured differently to accommodate different models of truck 12.

Turning now to FIG. 4, there is shown therein an exploded view of the FUPD 10 to illustrate how the FUPD is secured to a frame 82 of the truck 12. One skilled in the art will appreciate the frame 82 of the truck 12 as shown herein is positioned behind the bumper 16 illustrated in FIG. 1. As illustrated here in FIG. 4, the bolt holes 62 in the frame attachment surface 60 of the left attachment plate 52 and the right attachment plate 54 are mated to corresponding bolt holes 84 in the frame 82 of the truck 12. Additionally, the bolt holes 70 in the brackets 66 and 68 are aligned with corresponding holes in a bottom portion 86 of the frame 82, as shown by dashed lines in FIG. 4. After the support assembly 40 is secured to the frame 82, the front bar assembly 20 is attached by securing with bolts the mount plates 34a and 34b of the front bar assembly to the mount plates 50a and 50b of the support assembly.

Continuing with FIG. 4, a plurality of tow hooks 88 are shown. The tow hooks 88 are common accessories for a medium duty truck 12. In the present invention, the tow hooks 88 serve the additional purpose of providing strength and stability to the FUPD 10. As shown, the tow hooks 88 comprise a block of steel, and are preferably positioned on a bottom surface of the frame brackets 66 and 68 and against the attachment plates 52 and 54. The tow hooks 88 have a set of horizontal bolt holes 90 and a set of vertical bolt holes 92. The horizontal holes 90 are aligned with holes in the hood attachment plates 80, and the vertical holes 92 are aligned with the bolt holes 70 in the frame brackets 66 and 68. As installed, the tow hooks 88 would project between and forward of the bumper 18 and the front bar assembly 20. With the tow hooks 88 secured in place, preferably with bolts (not shown), the tow hooks provide additional rigidity to the support assembly 40. One skilled in the art will appreciate the need for rigidty in the FUPD 10, as the various regulatory requirements often dictate a limit to the permitted bend or flex of the FUPD. The present invention has been designed so that the front bar assembly 20 and the support assembly 40 have maximum rigidity.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A front under-run protection device for use with a medium duty truck, the device comprising:
    a front bar assembly comprising:
        a longitudinal tube having a front side and a back side;
        a plurality of bar gussets secured to the back side of the tube; and
        a plurality of mounting plates secured to the back side of the tube; and
    a support assembly comprising:
        a longitudinal beam;
        a plurality of mount plates secured to a front side of the beam;
        a left attachment plate and a right attachment plate, each attachment plate comprising:
            a beam contact surface secured to an end of the beam; and
            a frame attachment surface, the frame attachment surface defining a slot;
            wherein each attachment plate is configured such that the frame attachment surface is positioned forward of a vertical plane containing the beam;
        a left frame bracket secured to the slot of the left attachment plate; and
        a right frame bracket secured to the slot of the right attachment plate;
    wherein each one of the mount plates of the support assembly are secured to one of the mounting plates of the front bar assembly.

2. The device of claim 1 wherein the support assembly further comprises a strengthening plate secured to the beam.

3. The device of claim 1 wherein the longitudinal tube of the front bar assembly comprises a curved shape; and
    wherein the bar gussets span a curved portion of the tube.

4. A vehicle having a front under-run protection device, the vehicle comprising:
    a vehicle frame;
    a vehicle bumper disposed forward of a front end of the vehicle frame;
    a front under-run protection assembly comprising:
        a support assembly comprising:
            a longitudinal beam;
            a strengthening plate secured to the beam;
            a plurality of mount plates secured to a front side of the beam;
            a left attachment plate comprising:
                a beam contact surface secured to a first end of the beam; and
                a frame attachment surface defining a slot;
                wherein the left attachment plate is configured such that the frame attachment surface is positioned forward of a vertical plane containing the beam;
            a right attachment plate comprising:
                a beam contact surface secured to a second end of the beam; and
                a frame attachment surface defining a slot;
                wherein the right attachment plate is configured such that the frame attachment surface is positioned forward of a vertical plane containing the beam;
            a left frame bracket secured to the slot of the left attachment plate; and
            a right frame bracket secured to the slot of the right attachment plate;
            wherein the frame attachment surface of the left attachment plate is connected to a left side of the front end of the vehicle frame and the frame attachment surface of the right attachment plate is connected to a right side of the front end of the vehicle frame; and
            wherein the left frame bracket is connected to the left side of the front end of the vehicle frame and the right frame bracket is connected to the right side of the front end of the vehicle frame;
        a front bar assembly comprising:
            a longitudinal tube having a front side and a back side, the tube having a curved shape such that the back side is convex;
            a plurality of bar gussets secured to the back side of the tube, the gussets disposed to span a curved portion of the tube; and
            a plurality of mounting plates secured to the back side of the tube;
            wherein the mounting plates are connected to the mount plates of the support assembly;
    wherein the front bar assembly is mounted directly below the vehicle bumper.

5. The device of claim 4 wherein the support assembly further comprises:
    a left bumper connection plate secured to an outside of the frame attachment surface of the left attachment plate; and
    a right bumper connection plate secured to an outside of the frame attachment surface of the right attachment plate;
    wherein the left bumper connection plate and the right bumper connection plate each comprise a plurality of bolt holes; and
    wherein the bumper is secured to the bolt holes of the bumper connection plates.

* * * * *